United States Patent [19]

Cadillac

[11] Patent Number: 4,511,109
[45] Date of Patent: Apr. 16, 1985

[54] MOUNT FOR A POWER RESCUE TOOL

[76] Inventor: Joseph A. Cadillac, 192 Chestnut Ridge Rd., Saddle River, N.J. 07458

[21] Appl. No.: 350,277

[22] Filed: Feb. 19, 1982

[51] Int. Cl.³ ............................................. F16M 11/00
[52] U.S. Cl. ...................................... 248/310; 248/176
[58] Field of Search ...................... 248/309.1, 310, 293, 248/291, 176; 312/30, 245; 108/131; 24/598, 609

[56] References Cited

U.S. PATENT DOCUMENTS

| | | | |
|---|---|---|---|
| 342,954 | 6/1886 | Ertell | 312/245 |
| 777,879 | 12/1904 | Blum | 24/598 |
| 943,623 | 12/1909 | Bloom | 312/30 |
| 1,183,373 | 5/1916 | Guhl | 312/30 |
| 1,227,384 | 5/1917 | Cary | 312/30 |
| 1,347,611 | 7/1920 | Blenko | 248/293 |
| 1,754,714 | 4/1930 | Gundsup | 248/310 |
| 1,861,802 | 6/1932 | Kelly | 312/245 |
| 2,004,786 | 6/1935 | Gaus | 248/310 |
| 3,714,619 | 1/1973 | Morgan | 248/291 |
| 4,132,295 | 1/1979 | Hochfelsen | 312/30 |
| 4,206,896 | 1/1980 | Cadillac | 248/310 |

Primary Examiner—Reinaldo P. Machado
Assistant Examiner—Alvin Chin-Shue
Attorney, Agent, or Firm—Shoemaker and Mattare, Ltd.

[57] ABSTRACT

A mount for a power rescue tool including a hinge having a first leaf fixed on a mounting surface and a second leaf pivotably connected thereto, an elongated mounting plate fixed to the second leaf for movement therewith, a pair of spaced leg holders mounted on the plate on opposite sides of a centerline of the plate for slidingly accommodating legs of a power rescue tool, a catch for maintaining the plate releasably attached to the mounting surface, tool movement limiting structure for limiting pivotal movement of the plate so that a power rescue tool can be mounted thereon for expeditious removal thereof without the danger of flipping over too far, and a tool height compensating structure which also functions to limit the pivotal movement of the plate.

11 Claims, 8 Drawing Figures

MOUNT FOR A POWER RESCUE TOOL

BACKGROUND OF THE INVENTION

The present invention relates in general to supports, and, more particularly, to movable supports.

Many, if not all, emergency vehicles, such as fire engines, and the like, carry Hurst (TM) power rescue tools to remove doors, or other such elements, from cars or other vehicles which have been disabled in a manner which prevents opening of the door in a normal manner. The Hurst (TM) power rescue tool is a well-known tool used by firemen and other rescuers and has proven to be an invaluable tool in many rescue operations. It is noted that hereinafter, in the interest of brevity, the term "Hurst" will be used without any trademark notation. However, it is to be understood that the term is used in a trademark sense even though such designation is omitted.

It is common to store the Hurst power rescue tool in a compartment on the rescue vehicle. Usually, on most vehicles, since a bracket is not available, the Hurst power rescue tool is stored laying down. The tool is, therefore, subject to damage unless it is fastened down, which usually encumbers its accessibility. As the power rescue tool is large and cumbersome to remove from such compartment, valuable seconds may be lost while the rescuers struggle to remove the power rescue tool from the storage area therefor. It is well known that even a second can be valuable in a rescue operation; thus, there is need for a device which permits a Hurst power rescue tool to be conveniently stored during non-use periods, yet which permits that power rescue tool to be quickly and easily removed for use. The inventor is not aware of any such device.

Even though rapid removal of equipment is a very important consideration, a competing consideration involves the fact that a wide variety of equipment must be carried on emergency vehicles. As storage space on these vehicles is limited, equipment must be selected carefully. Other equipment usually suffers due to this practice, and tangled equipment is a danger to both the rescuers and the people in peril. Thus, there is a need for a device which stores a Hurst power rescue tool in a manner which makes effective use of storage space so that the Hurst power rescue tool does not interfere with other equipment stored nearby, and vice versa.

A prior device addressed to this problem is disclosed in U.S. Pat. No. 4,206,896. However, while effective, this device suffers the drawback of being slightly cumbersome. The just-mentioned patented device also includes several component parts which require special manufacture.

Thus, there is need for a device which solves the above-discussed problems, but does not have the drawbacks of the just-mentioned patented device.

SUMMARY OF THE INVENTION

The device embodying the teachings of the present invention is an improvement on the device disclosed in the referenced patent and, like that device, permits convenient storage of a power rescue tool such as a Hurst power rescue tool, during non-use periods, yet makes the removal of that power rescue tool expeditious.

The device includes a platform having a pair of leg receiving bars mounted thereon to extend vertically upward from the platform. The bars have beveled tops to permit expeditious insertion of Hurst tool leg/handles thereonto. The bars slidingly accommodate the leg/handles of a Hurst power rescue tool. A cushion is located between the legs and the bottom of the piston cylinder of the Hurst tool rests on that cushion.

The platform is attached to a support by a hinge and includes a catch means to secure that platform to a mount when in the tool storing position. A tether means permits the platform to be tipped up into a tool removal position, but prevents that platform from flipping over far enough to cause the tool to fall off of the mount.

When the mount is in the out-of-the-way position, equipment, such as power packs, or the like, located behind the storage mount is exposed for easy access.

The presently disclosed device is an improvement over the device disclosed in U.S. Pat. No. 4,206,896, and the disclosure of this patent is incorporated herein by reference thereto.

The mount embodying the teachings of the present invention therefore permits storage of a Hurst power rescue tool in a position and location which makes the most effective use of available storage space, yet which will permit presentation of such a power rescue tool for rapid removal thereof. As seconds can prove to be vital, such presentation of the Hurst power rescue tool can be extremely important. The power rescue tool can be stored along with other equipment and still be readily accessible for rapid removal.

By tilting the Hurst tool out towards the operator, strain on a user's back is reduced by eliminating the need to bend down and to reach in to pick up this tool. This feature is important, as a Hurst power tool usually weighs approximately 57 lbs., and is very cumbersome. The tool is presented in the most favorable working position with regard to a user. Personal injury resulting from back strains, or the like, will thus be reduced.

OBJECTS OF THE INVENTION

It is, therefore, a main object of the present invention to mount a Hurst power rescue tool in a conveniently storable manner.

It is another object of the present invention to mount a Hurst power rescue tool in a manner which provides for the most expeditious removal thereof.

It is still another object of the present invention to prevent damage to a Hurst power rescue tool by restricting movement thereof during transportation of the tool.

These together with other objects and advantages which will become subsequently apparent reside in the details of construction and operation as more fully hereinafter described and claimed, reference being had to the accompanying drawings forming part hereof, wherein like reference numerals refer to like parts throughout.

BRIEF DESCRIPTION OF THE DRAWINGS

FIG. 1 is a perspective of a mount for a Hurst power rescue tool embodying the teachings of the present invention.

FIG. 2 is an elevation view taken along line 2—2 of FIG. 1.

FIG. 3 is a perspective of the mount in a tool dispensing orientation.

FIG. 4 is an elevation view taken along line 4—4 of FIG. 3.

FIG. 5 is a perspective of the mount in a fully open orientation.

FIG. 6 is an elevation view taken along line 6—6 of FIG. 5.

DETAILED DESCRIPTION OF THE INVENTION

Figure 7:
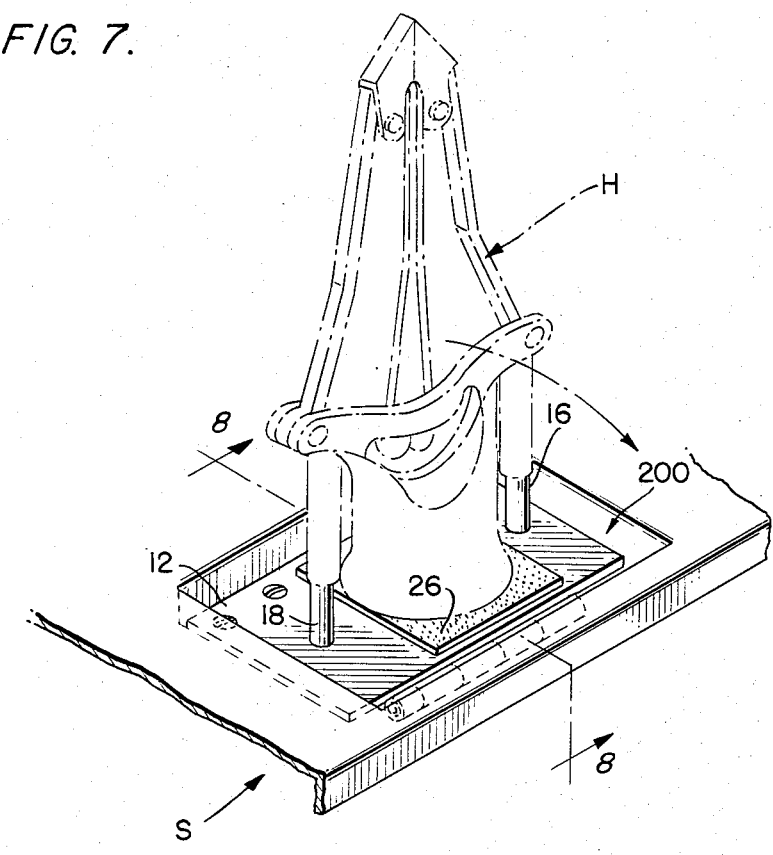
FIG. 7 is a perspective of an alternative embodiment of the device embodying the teachings of the present invention.

Shown in FIG. 1 is a mount 10 for mounting a Hurst power rescue tool H in a manner which permits that power rescue tool to be conveniently stored and expeditiously removed while exposing equipment stored therebehind after removal.

The mount 10 includes a planar base 12, preferably a platform having a rectangular shape and a pair of mounting bars or rods 16 and 18 affixed to the platform to project upwardly from upper surface 22 of the plate. A pad 26 is also affixed to the plate upper surface and is located between the rods. The rescue tool H has legs L and cylinder C, with the legs being removably mounted on the rods 16 and 18 and the cylinder resting on the pad 26 when the tool is supported on the mount 10. While the pad 26 is shown as being rectangular, any suitable peripheral shape can be used, such as circular, or the like.

As best shown in FIG. 5, the mount 10 is pivotally attached to a support means S by a hinge 30. The hinge includes a center leaf 32 securely affixed to the plate 12 on the rear surface 34 of that plate, and a frame leaf 36 securely affixed to the support means S by screws 38 or the like. A pintle 40 connects knuckles 42 located on adjacent sides 44 and 46 of the frame leaf and the center leaf, respectively. The hinge thus pivots about the pintle from the position shown therefor in FIGS. 1 and 2 to the position shown therefor in FIG. 5 so that the plate 12 assumes a tool accommodating position as in FIG. 1 and an out-of-the-way equipment access position shown in FIG. 5.

A plate catch means 50 attaches the upper end of the plate to the support means. The catch means 50 includes cleats 52 mounted on upper surface 54 of the support means S. The cleats include annular collars 56 and bases 58 with a friction clasp means 60 within bore 62 of the collars. The bases are mounted on the support means by fasteners, such as screws 66, or the like. The catch means also includes backstops 70 mounted on undersurface 34 of the platform by fasteners, such as screws 74, or the like.

As can be seen in FIG. 2, the backstops include projections 76 which are received in the bores of the collars 56 with upper rims 80 the collars abutting surfaces 78 of the backstops to support the plate 12 at the edge thereof which is remote from edge 82 which is attached to the hinge 30. The friction clasp means 60 grasps the projections 76 to attach the platform to the supports. However, the projections can be pulled out of the clasp means by grasping the platform and pulling so the mount can be tipped from the FIG. 2 position into the FIG. 4 position. The clasp means thus is merely a means of attaching the platform to the securing means in a manner which keeps the platform in the FIG. 2 position, but which permits expeditious release thereof so that the platform can be tilted into a tool removal orientation. A truck door clasp is an example of such a clasp means.

As best shown in FIG. 6, inner side edge 82 of the platform abuts side edge 86 of the support means S to maintain the plate in a level orientation when that plate is in the fully open position. The plate is thus essentially coplanar with the upper surface 54 of the support means S.

However, it is possible for the platform to move beyond the planar orientation shown in FIG. 6 if the edges 82 and 86 are suitably positioned with respect to each other.

A tether means 90 prevents the mount from tipping into an orientation in which the tool H may fall off of that mount. The tether means is best shown in FIGS. 4 and 5 and includes a pair of eye-bolts 92 mounted on surface 94 of the hinge center leaf. A chain 96 is looped and is attached at the ends thereof to each eye-bolt and has a spring catch or snap-hook 98 thereon near the middle thereof.

The snap-hook is coupled to an eye-hook 100 mounted on the upper surface 54 of the support means S to attach the plate to the support means via the tether means. The tether means serves as a quick-latch whereby the mount is prevented from flipping over too far when it is desired to tilt the mount with a tool mounted thereon. The snap-hook can be quickly detached from the eye-hook 100 to move the plate into the FIG. 5 out-of-the-way orientation after the Hurst tool is removed; however, the tether means supports the mount so that mount can be tilted into an orientation to permit expeditious removal of the Hurst tool without flipping over too far and thereby endangering the mounting of the tool.

Figure 8:
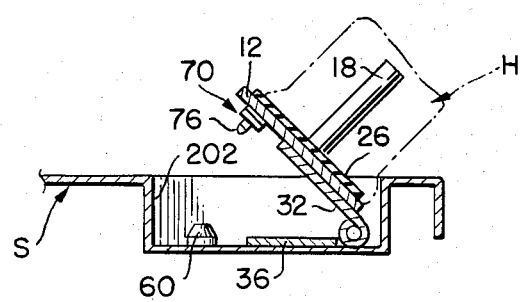
FIG. 8 is an elevation view taken along line 8—8 of FIG. 7.

Shown in FIGS. 7 and 8 is an alternative mount 10' of mount 10. The mount 10' includes tool height compensating means 200. The height compensating means 200 includes a pan 202 defined in the support means S. The rescue tool mount 10' is attached to the support S via the pan, and is otherwise similar to the above-discussed mount 10. The means 200 permits a tool H to be stored even if such tool is too tall for a conventional storage area. It is noted that the tool itself acts as the tethering device in this embodiment. Thus, the chains and hooks are deleted. The tool will contact the frame elements or the like to prevent overtipping, etc., and thus serves as its own tethering means.

As this invention may be embodied in several forms without departing from the spirit or essential characteristics thereof, the present embodiment is, therefore, illustrative and not restrictive, since the scope of the invention is defined by the appended claims rather than by the description preceding them, and all changes that fall within the metes and bounds of the claims or that form their functional as well as conjointly cooperative equivalents are, therefore, intended to be embraced by those claims.

I claim:

1. A mount for a power rescue tool comprising:
    a hinge having one leaf thereof fixed on a mounting surface and a second leaf pivotably connected thereto;
    an elongate mounting plate fixed to said hinge second leaf for movement therewith;
    a pair of spaced leg holders mounted on said plate on opposite sides of a centerline of said plate for slidingly accommodating legs of a power rescue tool;

a cushion mounted on said plate between said leg holders;

a catch means for maintaining said plate releasably attached to said mounting surface;

a tool movement limiting means for limiting the pivotal movement of said plate so that a power rescue tool can be mounted thereon for expeditious removal thereof without the danger of flipping over too far;

said catch means including a pair of anchors mounted on the mounting surface and a pair of backstops mounted on said plate to abut said anchors; and said hinge mounting further including an edge of said plate located to abut an edge of the mounting surface when said plate is in a level orientation and essentially coplanar with the mounting surface.

2. The mount defined in claim 1 wherein said tool movement limiting means includes an eye-hook mounted on the mounting surface, and a chain affixed at the ends thereof to said plate and having a quick-snap means thereon.

3. The mount defined in claim 1 wherein said plate is attached to said hinge to be pivotable about a longitudinal edge of said plate.

4. A mount for a power rescue tool comprising:

a hinge having one leaf thereof fixed on a mounting surface and a second leaf pivotably connected thereto;

an elongate mounting plate fixed to said hinge second leaf for movement therewith;

a pair of spaced leg holders mounted on said plate on opposite sides of a centerline of said plate for slidingly accommodating legs of a power rescue tool;

a cushion mounted on said plate between said leg holders;

a catch means for maintaining said plate releasably attached to said mounting surface;

a tool movement limiting means for limiting the pivotal movement of said plate so that a power rescue tool can be mounted thereon for expeditious removal thereof without the danger of flipping over too far; and further including a tool height compensating means with the mounting surface, and said compensating means further functioning as said tool movement limiting means for limiting the pivotal movement of said plate.

5. The mount defined in claim 4 wherein said tool height compensating means includes a pan defined in the mounting surface.

6. A device for holding a power rescue tool for easy access comprising:

a hinge having one leaf thereof fixed on a mounting surface and a second leaf pivotably connected thereto;

an elongate mounting plate fixed to said hinge second leaf for movement therewith;

a pair of spaced leg holders mounted on said plate on opposite sides of a centerline of said plate for slidingly accommodating legs of a power rescue tool;

a cushion mounted on said plate between said leg holders;

a catch means for maintaining said plate releasably attached to said mounting surface; and a tool movement limiting means which is quickly attachable/detachable for limiting the pivotal movement of said plate so that a power rescue tool can be mounted thereon for expeditious removal thereof without the danger of flipping over too far, and yet which means can be quickly detached for out-of-the-way orientation of said plate after the removal of the tool;

said mounting plate being attached to said hinge to be pivotable about a longitudinal edge of said mounting plate; and said hinge being arranged so that said edge of the mounting plate is located to abut an edge of the mounting surface when said plate is in a level orientation and essentially coplanar with the mounting surface.

7. The device defined in claim 6 wherein said tool movement limiting means includes an eye-hook mounted on the mounting surface, and a chain affixed at the respective ends thereof to said plate by eye-bolts and having a quick-snap means thereon near the midportion thereof for attachment to said eye-hook.

8. The device defined in claim 7 wherein said catch means includes a pair of anchors mounted on the mounting surface and a pair of backstops mounted on said plate to abut said anchors.

9. The device defined in claim 8 wherein each of the pair of anchors includes an annular collar having clasp means within the base thereof.

10. The device defined in claim 9 wherein each of the pair of backstops has a projection extending therefrom for complementary engagement with the clasp means of each collar.

11. The device defined in claim 10 wherein rims on said collars abut surfaces of said backstops for supporting the plate at the edge thereof remote from said hinge.

* * * * *